MODULAR CONSTRUCTED ENCLOSURE FOR MOUNTING EQUIPMENT THEREIN

Filed July 24, 1964

2 Sheets-Sheet 1

INVENTORS
Stanley E. Morgan and
Norman L. Kingsley
BY
Clement J. Poznokas
ATTORNEY

1

3,378,320
MODULAR CONSTRUCTED ENCLOSURE FOR MOUNTING EQUIPMENT THEREIN

Stanley E. Morgan, Williamsville, and Norman L. Kingsley, Cheektowaga, N.Y., assignors to Westinghouse Electric Corporation, East Pittsburgh, Pa., a corporation of Pennsylvania Filed July 24, 1964, Ser. No. 384,912
17 Claims. (Cl. 312—108)

This invention generally relates to enclosures for mounting equipment therein, and more specifically to modular construction of such enclosures. Major mechanical requirements for electrical apparatus are suitable mounting and enclosure structures for electrical components and panels. Past conventional practices have involved angle iron frame works plus covers and side sheets made of sheet metal to form a completed cabinet.

The present invention is directed to a novel modular construction for such enclosures wherein modules having a unique apertured channel edge configuration permit the use of a minimum number of types of standardized modular forms to make a great variety of enclosure and mounting configurations.

It is therefore an object of the present invention to provide a novel modular constructed enclosure for mounting equipment therein.

Another object is to provide novel modules for use in modular construction of such enclosures, which modules lend themselves toward assemblage in a great number of possible enclosure variations.

A further object is to provide modules with a unique edge construction which provides strength, a bearing surface for stacking modules, and a mounting surface for equipment components.

The advantages of the invention herein may be realized in accordance with one embodiment wherein a modular enclosure is made of a plurality of side-defining modules at least one of which has a plate portion having at opposite ends thereof channel configurated edges each of which includes spaced, parallel, first and second opposite sides sparated by a bottom third side, the bottom side and one of the parallel sides each being provided with a plurality of apertures spaced along the length of the channel. Another of the modules has at least one connection surface intimately engaging the bottom side of at least one of said channel edges on the first module the connection surface having apertures aligned with apertures of the engaged bottom side.

Other and further objects and advantages of the invention will become apparent from the following detailed description taken in connection with the drawings wherein preferred embodiments of the invention are illustrated.

(FIG. 2 is exploded) of two enclosures illustrating the versatility of a U-shaped module made in accordance with the present invention.

Figure 1:
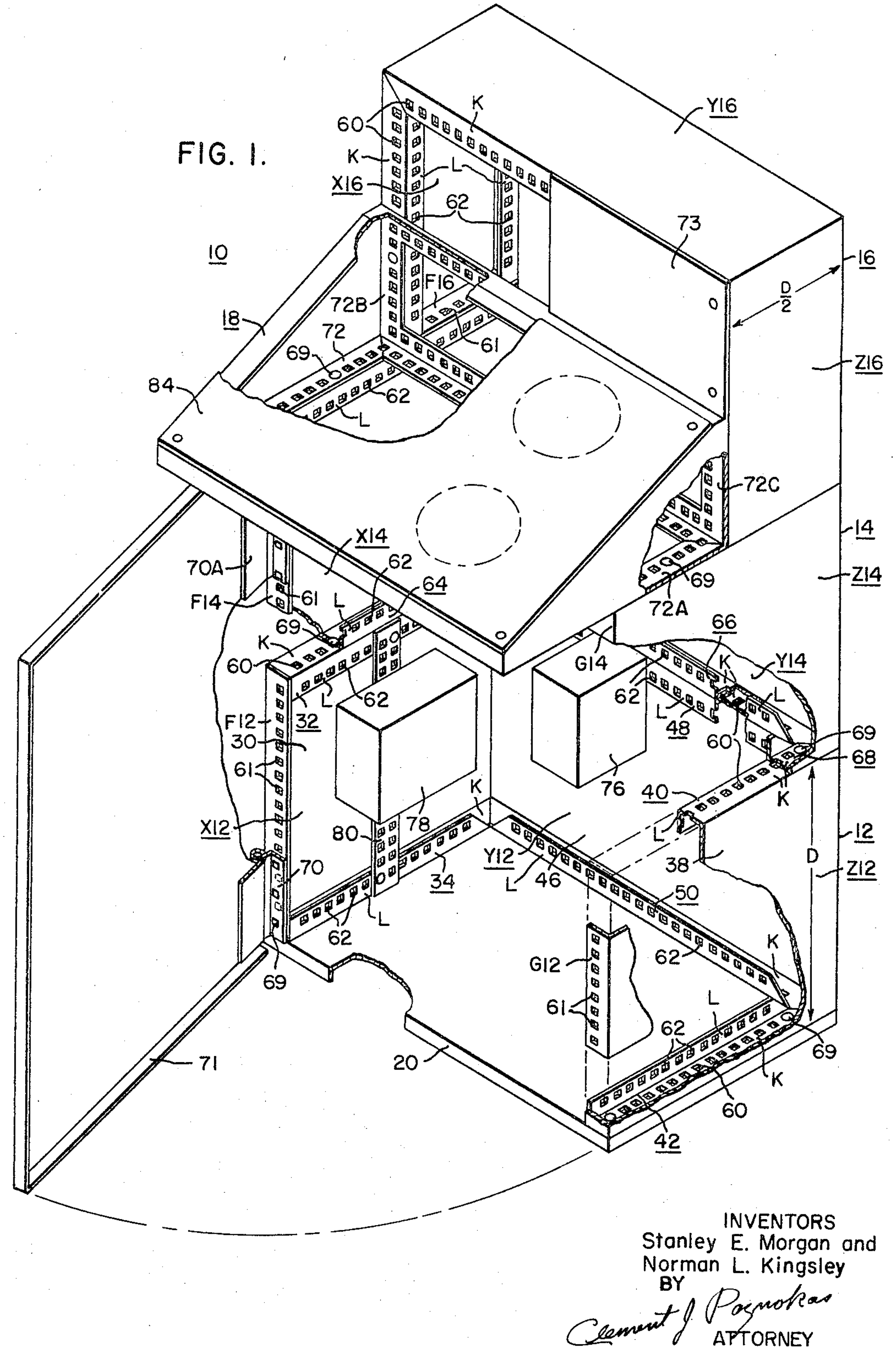
FIGURE 1 is an isometric view of a cabinet illustrating overall aspects of the present invention.

The cabinet 10 in FIG. 1, aside from covers and doors, is made of three U-shaped modules 12, 14 and 16, a slant front module 18, and a base module 20, which lend themselves to standardization for cooperative use with each

2 other in a great number of possible variations. An important feature which permits the versatile interfit between modules is a unique channel edge construction employed in modules 12, 14 and 16, and in a later described "spacer" module.

Modules 12 and 14 are exactly alike, while module 16 is similar in all respects except for its depth dimension $D/2$ which is one-half of the depth dimension D of module 12. Because of the similarity between modules 12, 14 and 16, only module 12 will be described in detail. Certain corresponding parts in all the U-shaped modules shown in all the figures have the same main reference characters modified, however, by subscripts identifying them with a particular module. Each of the U-shaped modules is, for the best expression of the invention, made of an integral sheet of metal, for example 14 gauge sheet steel, bent into a U-shaped configuration having opposite legs X and Z extending at right angles from the opposite ends of an intervening yoke Y. For example, module 12 is provided with legs X12 and Z12 and a yoke Y12.

Leg X12 has a main plate section 30 having upper and lower end parts each bent in a configuration providing inwardly directed channel-shaped edges 32 and 34 on opposite sides of the plate section. The front end-part of the plate section 30 is bent in a form providing an edge flange F12 along the free end of the leg. The leg Z12 is likewise provided with a main plate section 38 having inwardly directed opposite channel-shaped edges 40 and 42, and an edge flange G12 along the free end of the leg. It may be noted that the edge flanges at the free ends of legs X and Z of all the U-shaped modules are labeled F and G, respectively, with the particular module number as a suffix. The yoke Y12 has a main plate section 46 with inwardly directed channel-shaped edges 48 and 50 at opposite ends of the plate. Channel edges 32, 40 and 48 are in a first plane, while edges 34, 42 and 50 are in a second plane parallel to the first plane.

The plate section 30 defines a portion of the left side of the cabinet 10, while the plate section 38 defines a portion of the right side of cabinet 10, and the plate section 46 defines a portion of the back side of the cabinet.

Each channel edge has parallel opposite sides and an intervening bottom side. One of the opposite sides is constituted by the main plate section associated with that edge while the other opposite side of the channel faces or lies within the interior of the module and of the enclosure in which the module is integrated. All of the channel edge construction of all the disclosed modules is the same and may be illustrated and described by viewing the broken away views of channel edges 32, 34, 40, 42, 48 and 50 of module 12. Each channel edge is provided with opposite channel sides which with reference to the interior of the cabinet enclosure may be referred to as inner side and outer side of the channel. The inner side of each channel edge is referenced by the letter L, while the outer side is constituted by the main plate portion with which the channel edge is associated (of which the edge is a part). For example, channel edge 40 is associated with the main plate portion 38 of leg Z12, and the outer side of channel 40 is therefore constituted by the main plate section 38. Each channel edge is further provided with a bottom side K at right angles with the opposite sides of the channel.

The bottom side K forms a flange while the inner side L is a lip extending from the flange. Thus each of the channel-shaped edges is provided with a flange K and a lip L reentrantly extending from the flange. The flange K extends at right angles from the main plate portion to form the bottom of the channel configuration, while the plate section and the lip L form opposite sides of the channel configuration.

The flange K of each channel edge is provided with a plurality of apertures 60 uniformly spaced along the length of the flange. In like manner, a plurality of apertures 61 are uniformly spaced along the lengths of flanges F and G. Also the lip L of each channel edge is provided with a plurality of apertures 62 uniformly spaced along the length of the lip.

In the example shown, the space between adjacent apertures in each flange (all flanges F, G and K) is the same given increment, for example one inch. Since the apertures in each flange are uniformly spaced, and such uniform spacing is the same for each flange, any two apertures of each flange (all flanges F, G and K) are spaced a whole number (which may be 1 or greater) of equal given increments apart. The given increments may for example be one inch each. Thus all the flanges are provided with matched incremental spacing between apertures, whereby at least a number of apertures in each flange may be aligned with the same number of apertures in any other flange of another module having similar flange construction. From the foregoing, it is seen that the spacing arrangements of the apertures of all of the flanges (F, G and K) have a common matching relationship, i.e., a relationship wherein any flange (F, G or K) of a module may be joined to any flange (F, G or K) of another module in such manner that each flange at such a joint will have apertures aligned with apertures of the other flange at the joint. Thus such similarly related flanges may be joined in a manner to have at least two apertures of one aligned with the same number of apertures of the other. The spacing between apertures in the lip L of each channel edge is for example the same as that between apertures in each flange.

It should be noted that each of the flanges (F, G and all flanges K) on module 12 is used as a mounting surface for mating with or receiving a flange of another module or for connecting with other members such as a base or door or cover, etc. This is also true of the flanges on modules 14 and 16. More specifically, the flanges K of channel edges 32, 48 and 40 of module 12 mate with the flanges K of channel edges 64, 66 and 68 of module 14. The arrangement is such that apertures of the pairs of mating flanges are aligned with each other so that the mating flanges can be fastened to each other by means of fasteners 69 such as bolts, pins, et cetera. The flanges K of channel edges 34, 50 and 42 of module 12 rest upon and are joined with the upper surface of base 20 by fastening means 69 such as bolts or pins passing through flange apertures and corresponding apertures formed in the upper surface of base 20. The edge flanges F12 and F14 carry hinges 70 and 70A for a door 71, one edge of which engages the edge flanges G12 and G14 when the door is closed.

The flange K of the channel edge at the upper end of leg X14 of module 14 supports and mates with an apertured flange 72 along a bottom edge of slant front module 18 and with the edge flange F16 at the free end of leg X16 of module 16. In a similar manner, the flange K of the channel edge at the upper end of leg Z14 of module 14 supports and mates with an apertured flange 72A along a bottom edge of slant module 18 and with the edge flange G along the free end of leg Z16 of module 16. The flanges K of the channel edges at the front ends of legs X16 and Z16 connect with apertured flanges 72B and 72C on back edges of slant front module 18. The back and bottom edge flanges 72, 72A, 72B and 72C of the slant front module 18 are each provided with a plurality of apertures uniformly spaced along its length to match the incremental spacing of flanges F, G and K. A cover plate 73 is secured to the flanges K of the respective front channel edges of the legs X16, Z16 and yoke Y16 of the module 16. Modules 14, 16 and 18 are fastened together for example by bolts passing through corresponding apertures in the flanges at the mating joints.

Within the cabinet 10, equipment components may be mounted directly on the apertured lips L of various channeled edges or indirectly by mounting on vertical bars supported between the apertured lips L of different channel edges. For example, an electrical component 76 is shown bolted directly to the lip L of channel edge 48 of module 12. Also by way of example, an electrical component 78 is shown mounted on a bar 80 which is secured to the spaced lips L of channel edges 32 and 34 on the leg X12 of module 12.

The slant front module 18 may be employed as a console having a front panel 84 carrying instruments and controls (dot-dash circles).

The U-shaped module and the channel edge provide tremendous versatility and flexibility in the manner of the cooperative use and engagement with other modules, especially those having matched channel edge configurations as illustrated. The channel edge provides a number of advantages such as (a) desirable rigidity and strength; (b) the flange K provides a mounting or bearing surface for stacking modules together in various configurations; (c) modules can be fastened together by bolting or welding; (d) the channel edges provide wiring gutters; (e) provides mounting for panels and devices at specific modular increments in accord with the manner of stacking the various modules; (f) provides equipment mounting on back side and right and left sides of enclosure; (g) provides means for attaching covers or hinged doors.

Figures 2, 3, 4:
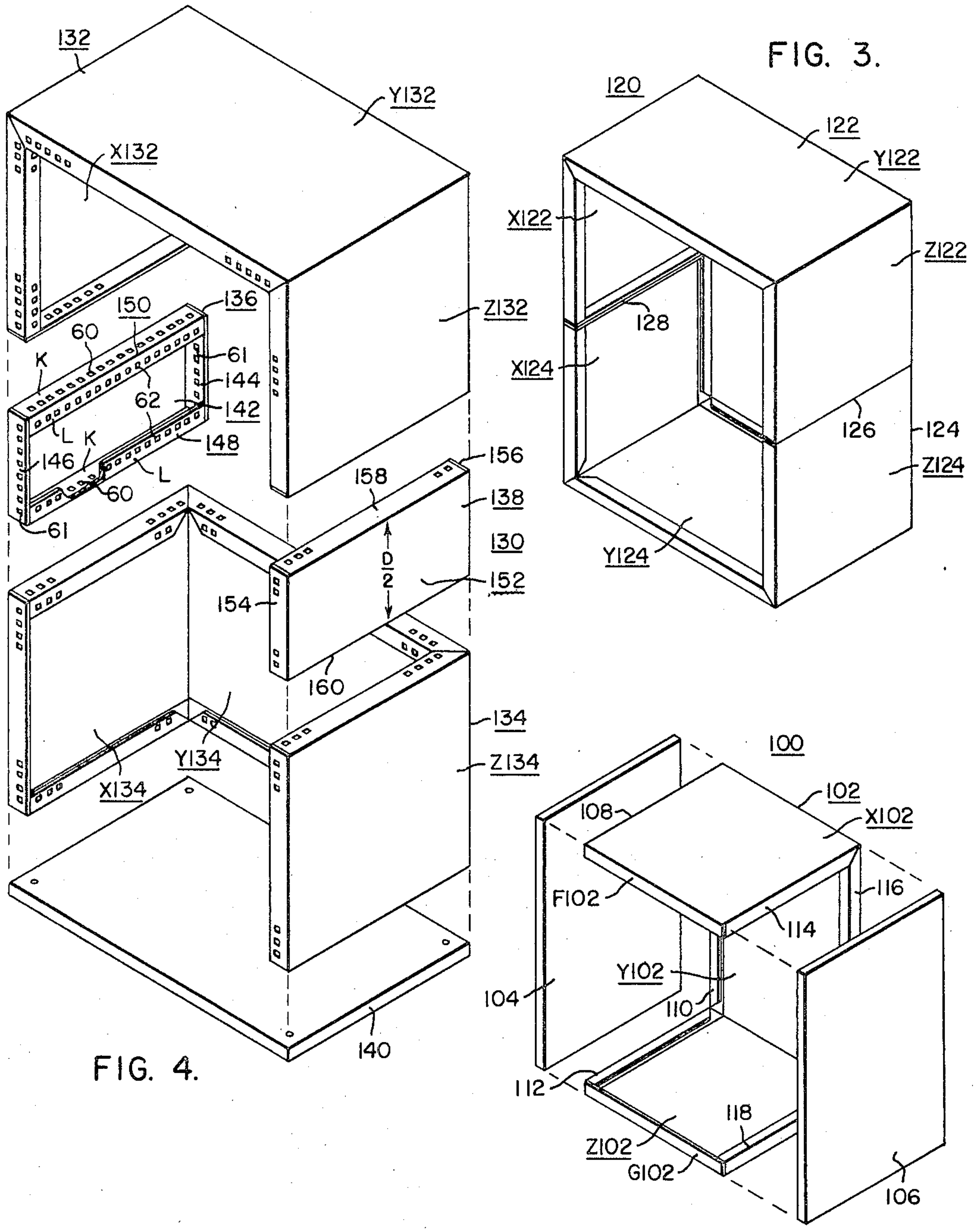
FIGS. 2 and 3 are views
FIG. 4 is an exploded view of another cabinet which further illustrates the versatility and the flexibility of modular construction according to the present invention.

Some of the great many variations possible with the modular construction of the present invention are further illustrated in FIGS. 2, 3 and 4, wherein all the U-shaped modules shown are constructed in the same manner as module 12 in FIG. 1. In the exploded view of FIG. 2, an enclosure 100 is made of a U-shaped module 102 and side plates 104 and 106 bolted to the apertured flanges K of channel edges 108, 110, 112, 114, 116 and 118 along opposite sides of legs X102 and Z102 and yoke Y102 of the module. The front side of the enclosure may have a hinged door or another plate similar to plate 104 as a cover or control panel, and fastened to the apertured edge flanges F102 and G102 at the free ends of legs X102 and Z102. Note that the leg Z102 acts as a base while the leg X102 forms a top for the cabinet.

FIG. 3 shows an enclosure 120 made of two U-shaped modules 122 and 124 with the edge flanges G along the free ends of the module legs mated and fastened together by bolts or pins passing through the matched apertures of the mated flanges and the interface at the junction of these flanges. More specifically, the module 122 is provided with legs X122 and Z122 and a connecting yoke Y122. Similarly module 124 is provided with legs X124 and Z124 and a yoke Y124. The edge flange at the free end of leg X124 provides a bearing surface mated with and supporting the edge flange at the free end of leg X122. In like manner, the flange along the free end of leg Z124 is mated with the flange along the free end of leg Z122. The edge of the interface formed by the juncture of the flanges at the free ends of legs Z124 and Z122 is indicated at 126. In like manner the mating junction between legs X122 and X124 may be seen at 128. Yoke Y122 forms the top side of the cabinet while the yoke Y124 forms the bottom side of the cabinet 120. The front and back of the cabinet 120 may remain open or be covered by plates or doors as desired.

In FIG. 4 there is shown an enclosure 130 (exploded view) made of two U-shaped modules 132 and 134 joined to spacer modules 136 and 138. Module 134 rests on and is secured to a base 140. The spacer modules 136 and 138 are alike, and each is provided around the periphery thereof with edge flanges and with channel edges having the same flange and lip construction as in the U-shaped modules. More specifically, spacer module 136 is provided with a main plate portion 142 having edge flanges 144 and 146, and channel edges 148 and 150. The edge flanges 144 and 146 have the same construction including matched incremental spacing of apertures as that of the edge flanges F and G at the free ends of the legs X and Z of the U-shaped modules. Channel edges 148 and 150 each have the same apertured flange K and apertured lip L construction as in the U-shaped modules. Spacer module 138 is provided with a main plate portion 152 having therearound edge flanges 154 and 156 and channel edges 158 and 160.

Module 132 has legs X132 and Z132 and a yoke Y132, while module 134 has legs X134 and Z134 and the yoke Y134.

In assembled relation, the flange K of channel edge 148 at the lower end of spacer module 136 is mated with and supported by the flange K of the channel edge at the upper end of module leg X134. Similarly the flange K of channel edge 160 at the lower end of spacer module 138 is engaged with and supported by the flange K of the channel edge at the upper end of leg Z134. The flange K of channel edge 150 at the upper end of spacer module 136 is contiguous with and supports the edge flange G at the free end of leg X132. In like manner, the edge flange G along the free end of leg Z132 is matched and joined with the flange K of the channel edge 158 at the upper end of spacer module 138.

Yoke Y132 forms a top side for the cabinet 130. The open back space between the yoke Y134 and the yoke Y132 may, if desired, be covered with a cover plate by bolting the same to the apertured flanges at the back ends of modules 132, 136 and 138. The front of the enclosure 130 may be left open or may be closed by a panel or cover plate or hinged door as desired all of which may be fastened by bolts or pins passing through the apertures of the flanges at the forward ends of the respective modules.

In the configurations of FIGS. 2, 3 and 4, electrical components may be mounted by directly bolting or fastening them to the lips of channel edges of the modules employed, or by fastening the components to bars or brackets fastened to the lips of channel edges, as hereinbefore described in connection with the mounting of equipment in the enclosure shown in FIG. 1.

In all the configurations described, the various exterior surfaces, especially of cover plates, doors, tops and bases, may if desired be ventilated by suitable ventilating apertures punched or otherwise provided therein.

In the configurations of FIGS. 3 and 4, the top U-modules 122 and 132 may have substituted in their place cover plates to form the top of the respective cabinets. The result of such a substitution in FIG. 3, would be a cabinet formed by the module 124 and a top cover plate bolted to the edge flanges F and G along the free ends of legs X124 and Z124. In FIG. 4, such a substitution would result in a cabinet formed with the base 140 and modules 134, 136 and 138 stacked as shown, but with a top cover plate fastened to the flanges K of the channel edges 150 and 158 of the spacer modules 136 and 138.

Although apertures 60, 61 and 62 may be of any desired contour, they are preferably rectangular as shown, for use with aligning tools and drift pins having a corresponding rectangular cross section thus to provide easier and more accurate alignment. Also fasteners with shank portions having a rectangular cross section may be employed.

While spacer modules 136 and 138 are shown with a depth dimension $D/2$ corresponding to the depth dimension $D/2$ of the module 16, such spacer modules may be constructed with other depth dimensions for example twice $D/2$ or D, as that in modules 12 and 14. This, as with the different U-modules illustrated, provides a selection of a "fractional" size module and a "full" size module whose depth dimension is exactly divisible by the depth dimension of the fractional size module, thus to even further increase the number of possible combinations the U-modules and spacer modules may be arranged to provide different configurations of enclosures for mounting equipment therein.

It should be understood that wherever flanges are mated and fastened together in any of the configurations shown the fastening means may be bolts, pins, clamps, or welding, or any combination of these means.

From the description herein, it should be apparent that the present invention makes it possible to economically manufacture and stock a few basic types of modules from which an almost endless variety of enclosure configurations may be assembled. Thus the present invention provides an extremely versatile modular structure for enclosures having equipment mounted therein.

It is to be understood that the herein described arrangements are simply illustrative of the principles of the invention and that other embodiments and applications are within the spirit and scope of the invention.

We claim as our invention:

1. In an enclosure for mounting equipment therein, a first structural member having a main plate section defining at least a portion of a side of said enclosure, said plate section having at different borders thereof inwardly facing channel-shaped edges each comprising a flange extending from the plate section at an angle thereto and a reentrant lip extending from the flange at an angle thereto, whereby said plate section and said lip form opposite sides of said channel shape and said flange forms the bottom of said channel shape, said flange having a plurality of apertures spaced along the length thereof, said lip having a plurality of apertures spaced along the length thereof, whereby equipment may be secured to said lip, and at least one other structural member having at least one surface in connecting engagement with the flange of at least one of said channel edges, said surface having apertures in alignment with apertures of said flange connected to said surface.

2. In an enclosure for mounting equipment therein, a plurality of structural members each having a main plate section defining at least a portion of a side of said enclosure, said plate section having at different borders thereof inwardly facing channel-shaped edges each comprising a flange extending from the plate section at an angle thereto and a reentrant lip extending from the flange at an angle thereto, whereby said plate section and said lip from opposite sides of said channel shape and said flange forms the bottom of said channel shape, said flange having a plurality of apertures spaced along the length thereof, said lip having a plurality of apertures spaced along the length thereof, whereby equipment may be secured to at least one of said lips, the apertures in all of said flanges having common matching spacing relations, the flange of a channel edge of one of said structural members being coupled to the flange of a channel edge of another of said structural members, apertures of one of said coupled flanges being aligned with apertures of the other of said coupled flanges.

3. A U-shaped structural module for use in constructing a peripheral portion of an enclosure for mounting equipment therein, said U-shaped module having a yoke and first and second legs extending from the opposite ends of the yoke, said legs and yoke each having a main plate portion for defining a different peripheral part of said enclosure, each of said plate portions having at opposite borders thereof inwardly directed channel-shaped edges, each having a flange extending from the associated plate portion and a reentrant lip extending from the flange, whereby the plate portion and the lip form opposite sides of the channel shape and the flange forms the bottom of the channel shape, the lip of at least one of said flanges having apertures spaced therealong, whereby equipment may be fastened to the lip, each of the aforesaid flanges having apertures spaced along the length of the flange, the spacing of apertures in all of the flanges having a common matching relationship, whereby any of said flanges of said module may be joined to a similarly related flange of another module and each flange at such a joint will have apertures aligned with apertures of the other flange at the joint.

4. In an enclosure for mounting equipment therein, a U-shaped module having a yoke and first and second legs extending from the opposite ends of the yoke, said legs and yoke each having a main plate portion defining a different peripheral part of said enclosure, each of said plate portions having an opposite borders thereof inwardly directed channel-shaped edges, each having a flange extending from the associated plate portion and a reentrant lip extending from the flange, whereby the plate portion and the lip form opposite sides of the channel shape and the flange forms the bottom of the channel shape, each of said flanges having therein apertures spaced lengthwise of the flange, the lip of at least one of said flanges having therein apertures spaced therealong, whereby equipment may be fastened to the lip, and structure means having a plurality of connection surfaces each joined to the flange of a different one of said channel edges, each said connection surface having apertures which are aligned with apertures of the adjoining flange.

5. In an enclosure for mounting equipment therein, a first structural member having a main plate section defining at least a portion of a side of said enclosure, said plate section having at each of a plurality of edges thereof flange means running along the edge and extending substantially at right angles to the plate section, each said flange means having a plurality of apertures spaced lengthwise thereof, the flange means of at least one of said edges having extending from it and at substantially right angles thereto reentrant lip means disposed along the flange means in its length direction, at least one of said lip means having apertures therein spaced therealong whereby equipment may be secured to the lip means, and a second structural member having a surface in connecting engagement with at least a part of said flange means of one of said edges, said surface having apertures aligned with apertures of the last said flange means.

6. In an enclosure for mounting equipment therein, a first structural member having a main plate section defining at least a portion of a side of said enclosure, said plate section having at each of a plurality of edges thereof flange means running along the edge and extending substantially at right angles to the plate section, each said flange means having a plurality of apertures spaced lengthwise thereof, the flange means of at least one of said edges having extending from it and at substantially right angles thereto reentrant lip means disposed along the flange means in its length direction, a second structural member having a surface in connecting engagement with at least a part of said flange means of one of said edges, said surface having apertures aligned with apertures of the last said flange means, and electrical component means secured to at least one of said lip means.

7. In an enclosure for mounting equipment therein, a plurality of structural members each having a main plate section defining at least a portion of a side of said enclosure, said plate section having at each of a plurality of edges thereof flange means running along the edge and extending substantially at right angles to the plate section, each said flange means having a plurality of apertures spaced lengthwise thereof, the flange means of at least one of said edges of at least one of said structural members having extending from it and at substantially right angles thereto reentrant lip means disposed along the flange means in its length direction, at least one of said lip means having apertures therein spaced therealong whereby equipment may be secured to the lip means, at least a part of said flange means of one of said edges of one of said structural members being coupled to at least a part of said flange means of one of said edges of another of said structural members, apertures of one of said coupled flange means being aligned with apertures of the other of said coupled flange means.

8. The combination as in claim 3 wherein said first structural module is integrally formed out of a single sheet of material.

9. In an enclosure for mounting equipment therein, a U-shaped module having a yoke and first and second legs extending from the opposite ends of the yoke, each of said legs having a free end with an edge flange thereacross, the flange having a plurality of apertures spaced therealong, said legs and yoke each having a main plate portion defining a different peripheral part of said enclosure, each of said plate portions having at opposite borders thereof inwardly directed channel-shaped edges, each having a flange extending from the associated plate portion and a reentrant lip extending from the flange, whereby the plate portion and the lip form opposite sides of the channel shape and the flange forms the bottom of the channel shape, the lip and flange each having a plurality of apertures spaced along its length, the spacing of said apertures in all of the flanges being arranged to have a common matching relation, and structure means having a plurality of connection surfaces each joined to a different one of said flanges, each connection surface having apertures which are aligned with apertures of the adjoining flange.

10. In an enclosure for mounting equipment therein, said enclosure being made up of a plurality of modules defining portions of sides of said enclosure, a first module having a main plate portion with a plurality of edges, each bent into a channel configuration having first and second parallel side walls separated by a bottom wall at right angles to the side walls, the first side wall being constituted by said plate portion, said second side wall lying within the interior of the enclosure while said plate portion defines a portion of the exterior side of the enclosure, said channel bottom wall of each of said edges having a plurality of apertures spaced along the length thereof, said second side wall of each of said edges having a plurality of apertures spaced along the length thereof for conveniently mounting equipment within the interior of said enclosure, a second module having a connection surface with a plurality of spaced apertures, the channel bottom wall of one of said edges being in contiguous relation with said connection surface, whereby that channel bottom wall and the connection surface are mated to form an interface wherein a plurality of the apertures along the latter channel bottom wall are aligned with a corresponding number of apertures in the connection surface.

11. The combination of claim 1 wherein said first structural member is formed in one piece from a sheet of material.

12. The combination of claim 2 wherein each of said one and said another structural members is formed in one piece from a sheet of material.

13. The combination of claim 3 wherein the end edge of the free end of each of said legs has extending therefrom and therealong an inwardly directed end flange having a length direction along said end edge and also having a plurality of apertures spaced lengthwise of that flange and in accordance with said common matching relationship.

14. The combination of claim 4 wherein said module is formed in one piece from a sheet of material.

15. The combination of claim 5 wherein the spacing arrangements of apertures of all said flange means have a common matching relationship.

16. The combination of claim 5 wherein said first structural member is made in one piece from a sheet of material.

17. The combination of claim 7 wherein each of said one and said another structural members is made in one piece from a sheet of material.

References Cited

UNITED STATES PATENTS

| | | | |
|---|---|---|---|
| 2,007,184 | 7/1935 | Dunning | 240—4 |
| 2,319,415 | 5/1943 | Lightfoot | 312—257 X |
| 2,709,634 | 5/1955 | Blashfield | 312—111 |
| 2,902,328 | 9/1959 | Auer | 312—108 |
| 3,003,083 | 10/1961 | Wilkinson | 317—120 X |
| 3,012,835 | 12/1961 | Anderson et al. | 312—257 |
| 3,110,535 | 11/1963 | Anderson | 312—257 X |
| 3,154,358 | 10/1964 | Blasch | 312—223 X |
| 3,201,656 | 8/1965 | Houck | 317—117 |

FOREIGN PATENTS

| | | |
|---|---|---|
| 1,264,933 | 5/1961 | France. |
| 955,999 | 4/1964 | Great Britain. |

ROY D. FRAZIER, *Primary Examiner.*

CHANCELLOR E. HARRIS, ABRAHAM FRANKEL, *Assistant Examiners.*